(12) United States Patent
Roberts et al.

(10) Patent No.: US 11,255,389 B2
(45) Date of Patent: Feb. 22, 2022

(54) AIR DISC BRAKE ADJUSTER MECHANISM

(71) Applicant: MEI Brakes Limited, Sheffield (GB)

(72) Inventors: Paul Roberts, South Wales (GB);
Jonathan Leslie Christopher Jackson, Ross on Wye (GB)

(73) Assignee: MEI BRAKES LIMITED

( * ) Notice: Subject to any disclaimer, the term of this patent is extended or adjusted under 35 U.S.C. 154(b) by 0 days.

(21) Appl. No.: 16/999,320

(22) Filed: Aug. 21, 2020

(65) Prior Publication Data

US 2021/0054887 A1 Feb. 25, 2021

(30) Foreign Application Priority Data

Aug. 22, 2019 (GB) ..................................... 1912080

(51) Int. Cl.
| | |
|---|---|
| *F16D 43/21* | (2006.01) |
| *F16D 45/00* | (2006.01) |
| *F16D 65/56* | (2006.01) |
| *F16D 41/20* | (2006.01) |

(52) U.S. Cl.
CPC .......... *F16D 43/215* (2013.01); *F16D 45/00* (2013.01); *F16D 65/568* (2013.01); *F16D 41/20* (2013.01)

(58) Field of Classification Search
None
See application file for complete search history.

(56) References Cited

U.S. PATENT DOCUMENTS

| | | | |
|---|---|---|---|
| 7,926,626 B2 | 4/2011 | Iraschka | |
| 2013/0256076 A1 | 10/2013 | Malki et al. | |

*Primary Examiner* — Timothy Hannon
(74) *Attorney, Agent, or Firm* — Invention To Patent Services; Alex Hobson

(57) ABSTRACT

An adjuster for an air disc brake includes an over-torque clutch arrangement that includes an adjuster drive plate having ramped detents, and a ball-carrying plate having pockets for retaining ball bearings. Ball bearings are carried and retained in the ball-carrying plate, and transmit rotation between the adjuster drive plate and the ball-carrying plate below a torque threshold. Above a torque threshold, the balls move axially away from the adjuster drive plate against the force of a spring, and ride up the ramped detents. Above the torque threshold, rotation is not transmitted.

18 Claims, 6 Drawing Sheets

AIR DISC BRAKE ADJUSTER MECHANISM

CROSS REFERENCE TO RELATED APPLICATIONS

This application claims the benefit of priority to GB1912080.7, filed on Aug. 22, 2019; the entirety of which is hereby incorporated by reference herein.

BACKGROUND OF THE INVENTION

Field of the Invention

The present invention relates to an adjuster mechanism, particularly an adjuster mechanism for an air disc brake. The brake may be used in a large commercial vehicle, for example a bus, a truck or a trailer.

Background

In an air disc brake, when the brakes are not applied there is a "running clearance" between the brake disc and the brake pads. It is required to accurately maintain this running clearance throughout the life of the wear parts of the brake, to provide consistent and reliable brake operation. Typically, the running clearance is for example 0.8 mm between the disc and the pads in the "brakes off" position. Accurately setting and maintaining the running clearance is important for achieving safe and legal brake performance As the wear parts (in particular the brake pads) wear down and reduce in thickness, the pads need to be moved towards the disc in order to maintain the running clearance with thinner worn pads. Known air disc brakes include an adjuster which performs this function. The adjuster is operated by rotational input from rotation of the brake lever, which is proportional to the linear input stroke from the pneumatic brake cylinder. The running clearance is set by defining the clearance between the lever drive pin and the adjuster input shaft, so that the lever drive pin can move a certain amount (equivalent to the required running clearance) before the adjuster is engaged at all. If the brakes are correctly adjusted then this is the distance which the lever drive pin will move before the brake pads come into contact with the brake disc. If the running clearance is larger than the setpoint, due to pad wear, the lever drive pin will move further and engage the adjuster, which will then cause the pistons to be adjusted towards the disc, correcting the running clearance to the setpoint. The adjuster includes a one-way drive, for example a sprag clutch or a wrap spring. This ensures that once the pistons have been adjusted towards the disc to set the running clearance correctly, they are not de-adjusted back again on the brake off-stroke.

Once the brake pads are in contact with the brake disc and the brake starts to generate braking force, the lever and drive pin may continue to move. This is because the large braking forces cause significant compression of the brake pads as well as deflection of the brake caliper. Once the pads are in contact with the disc and these braking forces are being applied, the adjuster should not be adjusting the pistons any further towards the disc. At this point continued rotation of the brake lever does not indicate too much running clearance, only that the pads and caliper are, as expected, deforming in operation of the brake. Therefore, known adjusters include an over-torque clutch, often a détente clutch, which ensures that the adjuster only transmits rotational movement from the brake lever in order to adjust the brake at relatively low braking forces. The cut-off load should be sufficient to ensure that both pads are properly in contact with the disc when adjustment stops. This over-torque cut-off needs to be high enough to ensure that it accounts for the friction in the threads of the pistons and that adjustment can take place before the pads touch the disc, but low enough that as soon as both pads contact the disc the adjustment stops.

When worn brake pads are replaced, the pistons need to be wound back or "de-adjusted" to re-set the running clearance for the new pads.

The over-torque clutch can be provided by multiple flat clutch plates loaded by a helical spring. Such a design is disclosed for example in US2006090968. However, this type of clutch does not provide a consistent torque limit over its life and can provide unreliable adjustment, tending to "stick-slip" due to wear at the clutch plates. This type of clutch necessitates a relatively low spring force and special high-performance grease to minimise wear of the clutch plates.

The over-torque clutch may alternatively be provided by a détente clutch. An adjuster using this design is described in EP1740845. This type of clutch includes ball bearings disposed between two clutch plates, the clutch plates including pockets to receive the balls bearings. A spring biases the clutch plates together. At low torques, the balls will remain in the pockets and turning one clutch plate will, via the ball bearings, turn the other clutch plate. However, at a high torque load the spring force will be overcome, and the clutch plates will be moved apart from one another allowing the balls to ride up ramps, out of their pockets. At high torques therefore, the clutch does not transmit motion.

The détente clutch usefully provides an audible 'click' when a service technician is setting the pad-to-disc running clearance after changing the pads and/or disc. Détente clutches also tend to provide more reliable performance and a more consistent torque cut-off over their lifetime as compared to flat clutch plates. However, détente clutches can be more expensive due to the high part count. In particular, it is necessary to pack the ball bearings in close proximity to each other. This is because when a ball is at the top of a ramp there is a point of instability, and it is possible for a ball to slip back down a ramp it has just ascended rather than moving into the next pocket. Multiple balls could then be accumulated on a single ramp, locking up the adjuster. To eliminate this possibility, balls have to be closely packed around the diameter of the clutch. This means either having a small diameter clutch (then necessitating a very strong spring to provide a sufficiently high torque cut-off point), or a large number of balls and a high part count and high cost.

The amount of displacement caused by the braking forces is particularly great when brand new pads are fitted, because new pads are softer and thicker. In a détente clutch with closely packed balls, the deflection under high braking forces can sometimes be so great that balls will rise all the way up the ramp and into the next pocket. This produces a clicking sound which may be perceived as a fault, although in fact it is just the détente clutch working in the over-torque condition as it is designed to do. It is desirable to eliminate this sound if possible, i.e. it would be useful to increase the angular displacement between clicks so that in normal use, even with new pads, there is no audible 'click'. However, this cannot be done in a detente clutch with closely packed balls without making the balls larger, further increasing cost.

To work around the problems of closely packed balls, a smaller number of balls can be assembled into a 'cage' to keep them in their correct positions during rotation, allowing a smaller number of balls on a larger diameter clutch. See for example EP2585732. However, incorporating the cage adds another costly component. Packaging space for the cage is restricted, limiting its durability, and also potentially requiring the use of larger diameter balls.

It is an object of the invention to overcome the above problems.

SUMMARY OF THE INVENTION

According to the present invention, there is provided an adjuster for an air disc brake, the adjuster comprising an input shaft for engaging with a brake lever drive pin, and an output for transmitting rotation to one or more brake pistons, the adjuster further including:
- a one-way clutch arrangement for transmitting rotation in one direction from the input shaft to the output, but preventing transmission of rotation from the input shaft to the output in the other direction; and
- an over-torque clutch arrangement for transmitting rotation from the input shaft to the output at low torques, but preventing transmission of rotation from the input shaft to the output above a predetermined torque threshold,
- characterized in that the over-torque clutch arrangement includes a clutch plate and a ball-carrying plate, a plurality of ball bearings, and a spring arrangement for forcing the ball bearings axially against the clutch plate, the clutch plate including detents for seating the ball bearings and preventing rotational movement of the ball bearings relative to the clutch plate as long as axial movement of the ball bearing relative to the clutch plate is prevented by the spring force, and the detents including ramps for allowing the ball bearings to move rotationally relative to the clutch plate when the axial force of the spring arrangement is overcome, and the ball-carrying plate including pockets for retaining the balls in position relative to the ball-carrying plate as the balls move rotationally relative to the clutch plate,
- in which one of the clutch plate and the ball-carrying plate provides an input to the over-torque clutch arrangement and the other of the clutch plate and the ball-carrying plate provides an output of the over-torque clutch arrangement.

Rotational movement is rotation about an axis of the adjuster. It will be understood that individual ball bearings of course may rotate about their own centres but this is not what is meant by rotational movement in this context.

Advantageously, the arrangement allows for a detente-type clutch giving accurate and reliable performance over its lifetime, with a relatively small number of balls for the diameter of the clutch, but in which there is no risk that more than one ball will accumulate into a pocket.

The balls may be spaced apart angularly around the clutch plate, and yet they are retained in position by the pockets of the ball-carrying plate.

The detents, with ramps, can be made long enough (i.e. cover a relatively large angular space around the clutch plate) that even the largest displacements caused by extreme braking loads with new and soft brake pads can be accommodated without the balls clicking into an adjacent detent.

This is achieved using a small number of relatively simple parts, and the overall size of the adjuster may also be kept small. The ball bearings may be a small diameter and small in number and yet the pitch circle diameter (PCD) of the balls in place on the clutch may be relatively large, allowing for a suitable torque cut-off without a very large spring force.

In one embodiment, the pockets in the ball-carrying plate are in the form of blind holes. The holes need to be deep enough (and therefore the ball-carrying plate needs to be thick enough) that the balls will be retained in the holes and will not come out even at very high torque loads. Preferably, the depth of the blind holes is at least half the diameter of the balls. The holes may have straight sides. In such an embodiment, the spring arrangement is arranged to bias the ball-carrying plate towards the clutch plate. In doing so, the balls are pushed against the clutch plate by the bases of the blind holes in the ball-carrying plate.

In another embodiment, the pockets in the ball-carrying plate are in the form of through holes in the ball-carrying plate. Again, the holes need to be deep enough to retain the balls in all anticipated conditions. A base for the through holes may be provided by a thrust washer disposed behind the ball-carrying plate, i.e. on the side of the ball-carrying plate facing away from the clutch plate. Providing the pockets in the form of through holes has several advantages. Firstly, it allows the clutch to be manufactured with a precise torque cut-off which is not dependent on tolerances in the depth of drilled blind holes. Secondly, it allows the axial displacement in high-torque conditions when the spring load is overcome to be taken up by movement of the balls and the thrust washer, relative to the ball-carrying plate. This means that the ball-carrying plate does not need to move axially with respect to the clutch plate, which in turn means that the ball-carrying plate may be incorporated into a clutch hub which transmits rotation to the output of the adjuster. Compared with prior art designs, this further reduces the complexity and number of bespoke parts, noting that suitable thrust washers are likely to be available as "off the shelf" parts.

The one-way clutch of the adjuster may preferably be provided by a wrap spring. Alternatively, it may be provided by a sprag clutch.

In an embodiment of an air disc brake, two pistons may be provided. The pistons transmit force from the brake lever to the brake pads. The pistons may be located to a return plate (i.e. fixed axially to the return plate although the pistons can extend by rotating the two threaded parts relative to each other). A spring is provided between the return plate and the inside front wall of the caliper housing (the front wall being the wall of the caliper which is closest to the disc). The spring biases the return plate, and hence the pistons, into the "brakes off" position. This ensures that when the brakes are no longer being applied by air pressure in the brake cylinder, the pads are moved clear of the disc.

In a twin piston design, the adjuster, such as an adjuster of the invention, may be centrally disposed between the pistons. The input and output of the adjuster may be on the rear side of the return plate, so that the input may be actuated by the brake lever and so that the output may turn gears on the rear side of the pistons. However, many of the working parts of the adjuster, including the over-torque clutch, may be on the front side of the return plate, i.e. between the return plate and the front wall of the caliper. In such an arrangement, the spring which provides the return force on the return plate may also be a spring of the spring arrangement which forces the ball bearings axially against the clutch plate The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

For a better understanding of the invention, and to show more clearly how it may be carried into effect, preferred embodiments will now be described with reference to the accompanying drawings in which.

Figure 1:
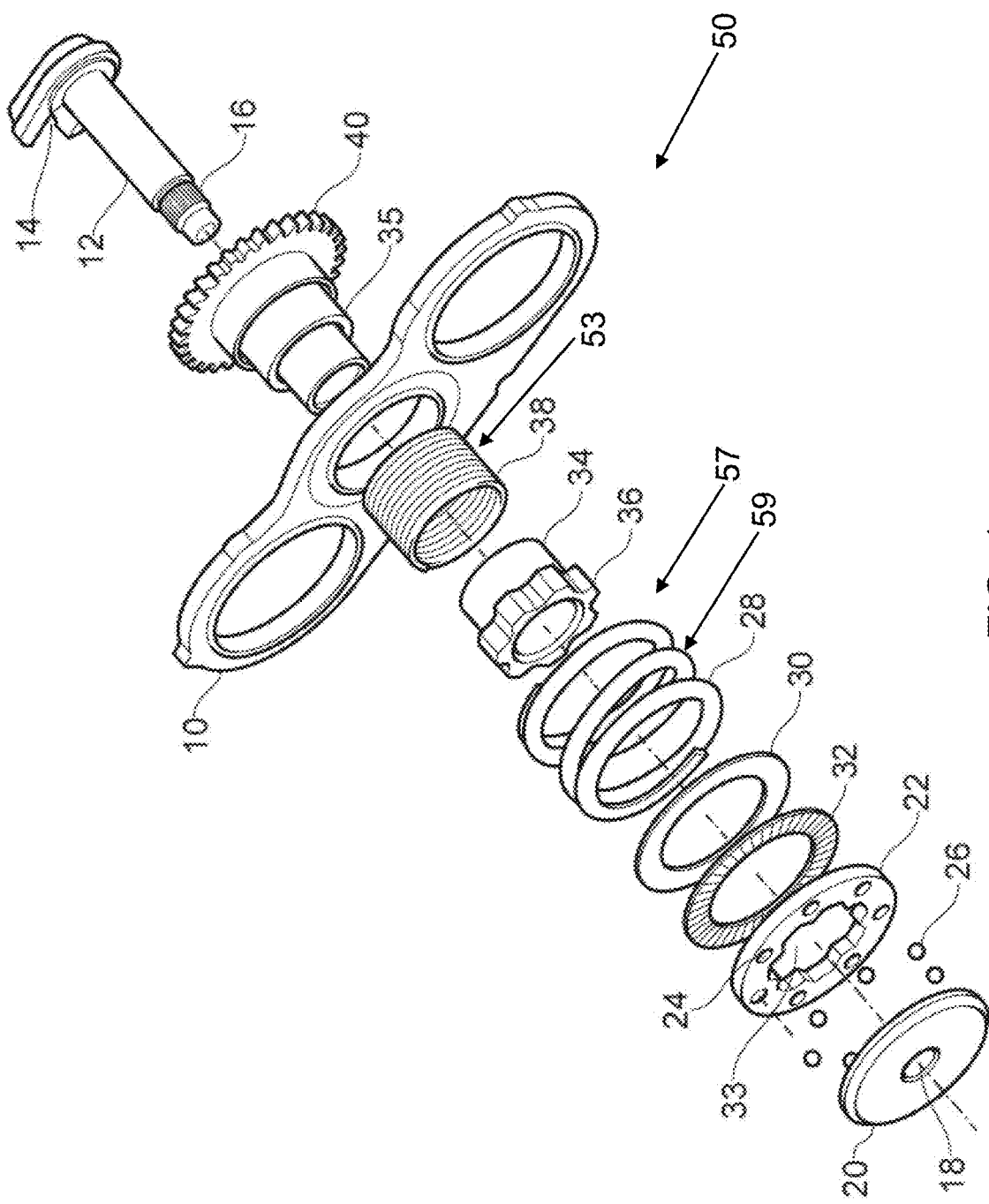
FIG. 1 is an exploded view of part of a disc brake, showing in particular a first embodiment of an adjuster according to the invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

Referring firstly to FIG. 1, an adjuster 50 mechanism is shown. For context, the return plate 10 of the disc brake is also shown. The arrangement shown is for use as part of a twin-piston brake. However, it will be apparent to the skilled person that a similar adjuster may be made for use in a single-piston brake, with appropriate modifications. The adjuster includes a spring arrangement 59 comprising a spring 28. The adjuster further comprises an over-torque clutch arrangement 57.

Most of the parts of the adjuster, i.e. everything on the side of the return plate 10 to the lower left of FIG. 1, are disposed between the return plate 10 and a front wall, or front cover, of the brake caliper. When assembled, major extents of the input shaft 12 and output hub 35 are also disposed between the return plate 10 and caliper front wall. The "front" side of the caliper is the side which faces the disc.

The adjuster input shaft 12 includes a slot 14 which is designed to engage with a brake lever drive pin. The brake lever drive pin is disposed in the "brakes off" condition so that it can move a little before engaging with the slot 14 of the adjuster input shaft. This movement of the drive pin without engaging the adjuster defines the running clearance of the brake, which is typically around 0.8 mm. When the brake lever drive pin moves more than this amount, it will engage with the slot 14 and cause the adjuster input shaft 12 to rotate.

The adjuster input shaft also includes a serrated press-fit formation 16. In this embodiment, the serrated press-fit formation 16 is at the opposite end of the adjuster input shaft to the slot 14. The serrated press-fit formation engages as a press-fit into a plain bore aperture 18 in an adjuster drive plate 20. The adjuster input shaft is rotationally coupled to the adjuster drive plate by the serrated press-fit interface. The adjuster drive plate forms a clutch plate of an over-torque clutch of the adjuster. This is the driving (i.e. input) side of the clutch in use.

As is apparent from FIG. 1, the slot 14 of the adjuster input shaft 12 is at one extreme end of the adjuster input shaft 12, and the serrated press-fit formation 16 is at the other extreme end. When the adjuster is assembled, the serrated press-fit formation 16 and adjuster drive plate 20 are at one end of the adjuster, and all the other parts are disposed in between the adjuster drive plate 20 and the input slot 14.

Although not visible in FIG. 1, the adjuster drive plate 20 includes detents to receive ball bearing balls 26. The detents are ramped, so that balls can move angularly around the adjuster drive plate 20 as long as the balls are able to move axially up the ramps. In this embodiment, there are seven detents disposed around the adjuster drive plate. If the ramps are double-sided, i.e. with a "rest" position in the centre of the detent and ramps extending from the rest position in both directions around the diameter of the adjuster drive plate, then this means that the balls may rotate around the adjuster drive plate by around 25 degrees before reaching the top of the ramp and dropping into the next detent. This is typically more than enough to accommodate the deflection even under very large braking loads with soft pads, without a ball "clicking" over to the next detent. The detents are disposed on the side of the adjuster drive plate which is not visible in FIG. 1.

A ball-carrying plate 22 is disposed adjacent to and axially in-line with the adjuster drive plate 20. The ball-carrying plate 22 includes a plurality (in this embodiment, seven) of blind holes 24 spaced around the face of the ball-carrying plate 22. With seven blind holes, the angular space between blind holes 24 is about 50 degrees. The PCD (pitch circle diameter) is sufficiently large that there are significant spaces between the holes. For example, the space between holes may be at least twice, preferably at least three times the diameter of one of the balls.

The blind holes are preferably straight-sided, and are sufficiently deep that they retain ball bearing balls 26 in position relative to the ball-carrying plate.

The ball bearing balls 26 are sandwiched between the adjuster drive plate 20 and the bottom of the blind holes in the ball-carrying plate 22.

A helical spring 28 is disposed between the brake return plate 10 and the ball-carrying plate 22. The spring 28 acts to force the ball-carrying plate 22 and the adjuster drive plate 20 together. Note that the front wall of the caliper housing, or a caliper cover plate (not shown in FIG. 1) may provide a reaction force against the spring on the other side of the adjuster drive plate 20. Alternatively, the adjuster drive plate 20 may be axially fixed to the adjuster input shaft 12.

In this embodiment, the same spring 28 also provides the return force to ensure that the brake returns to the "off" position when the brake cylinder is no longer pushing against the brake lever to operate the brake.

A thrust washer 30 and thrust bearing 32 ensure that the ball-carrying plate 22 may rotate smoothly relative to the spring 28.

The ball-carrying plate 22 provides the driven (i.e. output) side of the over-torque clutch arrangement. As long as the torque being transferred through the clutch is low enough that the force of the spring 28 is not overcome to allow the ball bearing balls 26 to move up the ramps of the detents in the adjuster drive plate 20, the adjuster drive plate 20 drives the ball-carrying plate 22 via the balls. If the torque increases beyond a certain threshold, the force of the spring 28 is overcome, allowing the balls to move axially and rise up the ramps. In this case the clutch will "slip", so that the ball-carrying plate 22 is no longer driven by the adjuster drive plate 20.

A clutch hub 34 includes a toothed sprocket end section 36. The sprocket end section corresponds with a toothed aperture 33 which is provided through the centre of the ball-carrying plate 22. When the ball-carrying plate 22 rotates, it rotationally drives the clutch hub 34. The toothed sprocket end section 36 of the clutch hub 34 extends along sufficient length of the clutch hub 34 to allow for axial movement of the ball-carrying plate 22 relative to the clutch hub 34, while the two parts are still rotationally attached. This axial movement allows for the balls to ride up the ramps in high-torque conditions when the spring 28 is overcome, while retaining the output gear 40 in its fixed position. The input slot is also retained axially, though it rotates with movement of the lever drive pin.

An output hub 35 includes an output gear 40. The output gear 40 rotationally drives the brake pistons, to extend the pistons and adjust the brake to take up wear and maintain the correct running clearance. The pistons each include two components which are threaded together so that the total extent of the piston increases as the components are rotated relative to one another. This rotation is driven by the output gear 40. The output hub includes a central aperture which allows the adjuster input shaft 12 to pass through the output hub 35, without being (directly) rotationally engaged. The output hub 35 further includes a central section which engages the clutch hub 34 via a one-way drive. In this embodiment, the one-way drive is provided by a wrap spring 38. This provides for a one-way clutch arrangement 53. The one-way drive ensures that the adjuster acts to adjust the brake pistons and take up any wear on the "brakes on" stroke. However, on the "brakes off" stroke, the brake lever drive pin will turn the adjuster input shaft in the other direction, but it is important that the adjustment is not taken off again when this happens.

Figure 2:
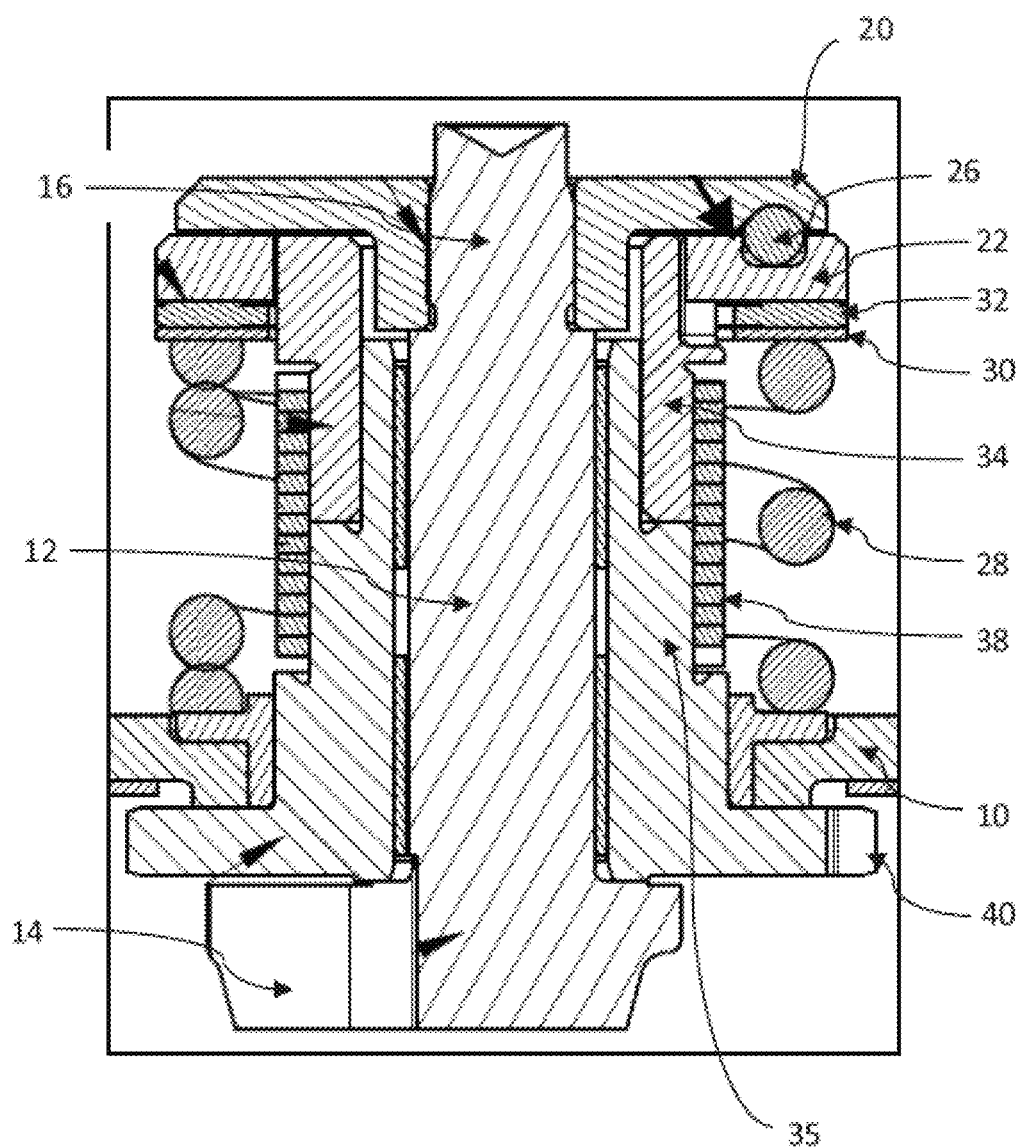
FIG. 2 is a cross section through the first embodiment of the adjuster.

FIG. 2 is a cross section of the same parts as FIG. 1, when fully assembled.

Figure 3:
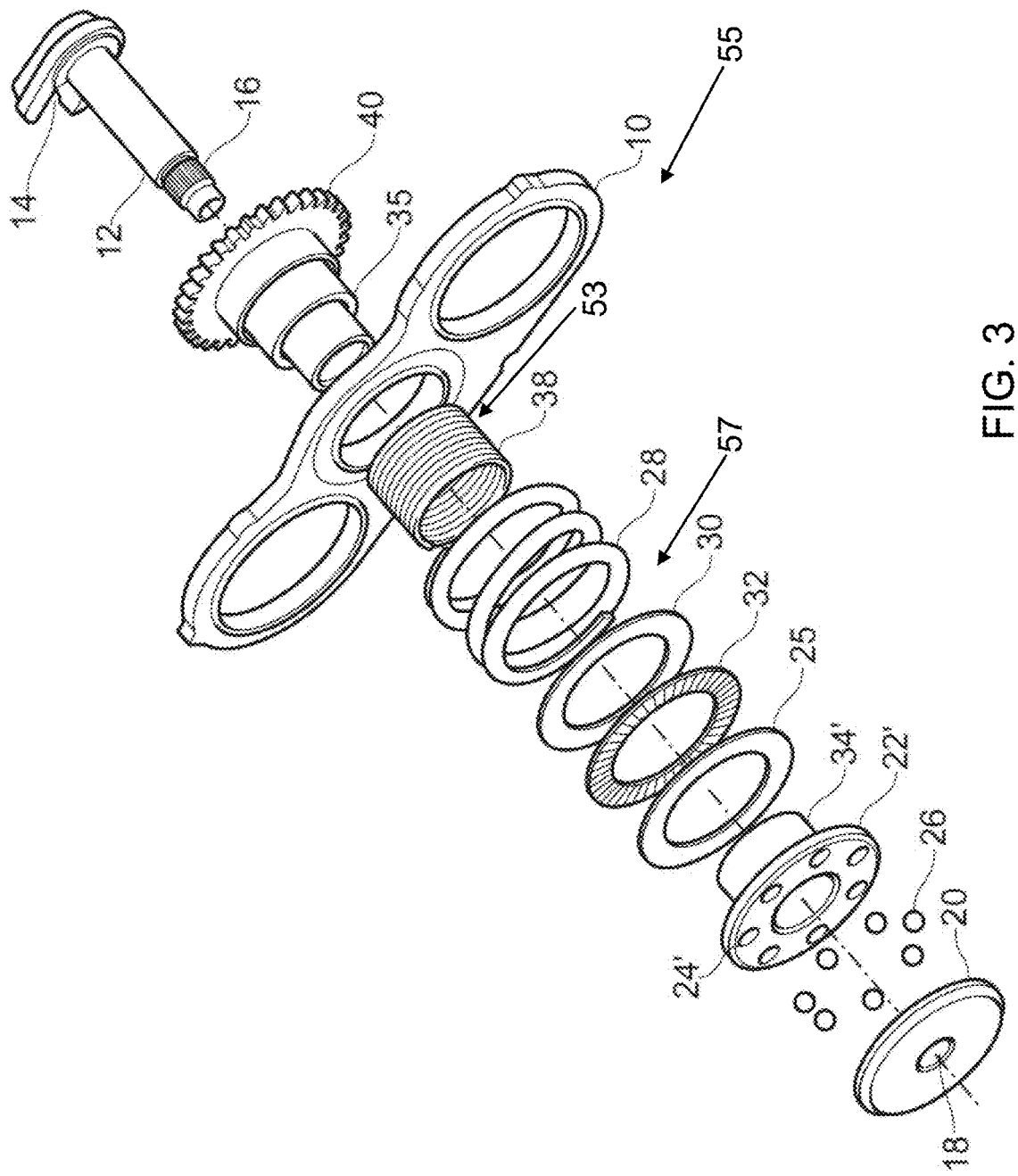
FIG. 3 is an exploded view of part of a disc brake, showing a second embodiment of an adjuster according to the invention.

FIG. 3 shows a second embodiment of the adjuster 55 arrangement of the invention. In many respects the embodiment of FIG. 3 is similar to the embodiment of FIG. 1. In particular the adjuster input shaft 12, including the input slot 14 and serrated press-fit formation 16 is identical. The output hub 35 including the output gear 40 is also the same. Other like parts are given the same reference numerals in the drawing. The adjuster includes a spring arrangement 59 comprising a spring 28 and an over-torque clutch arrangement 57.

However, in this second embodiment, the ball-carrying plate 22' includes through holes 24' instead of the blind holes of the first embodiment. The ball-carrying plate 22' is integrated into the clutch hub 34', instead of being connected to the clutch hub via an axially sliding sprocket as in the first embodiment.

A thrust washer 25 sits behind the ball-carrying plate 22'. The thrust washer 25 in effect provides a base for the through holes. The thrust washer 25 is what transmits the force of the spring 28 to the ball bearing balls 26. Furthermore, the thrust washer 25 in this embodiment moves to take up the axial movement of the ball bearing balls 26 in high torque conditions, with the ball-carrying plate 22' staying in a fixed axial position. This is what allows the ball-carrying plate 22' to be integrated with the clutch hub 34'. This embodiment is particularly advantageous since the number of custom-machined parts is further reduced, the thrust washers 25 and 30 and the thrust bearing 32 being readily available "off the shelf".

Figure 4:
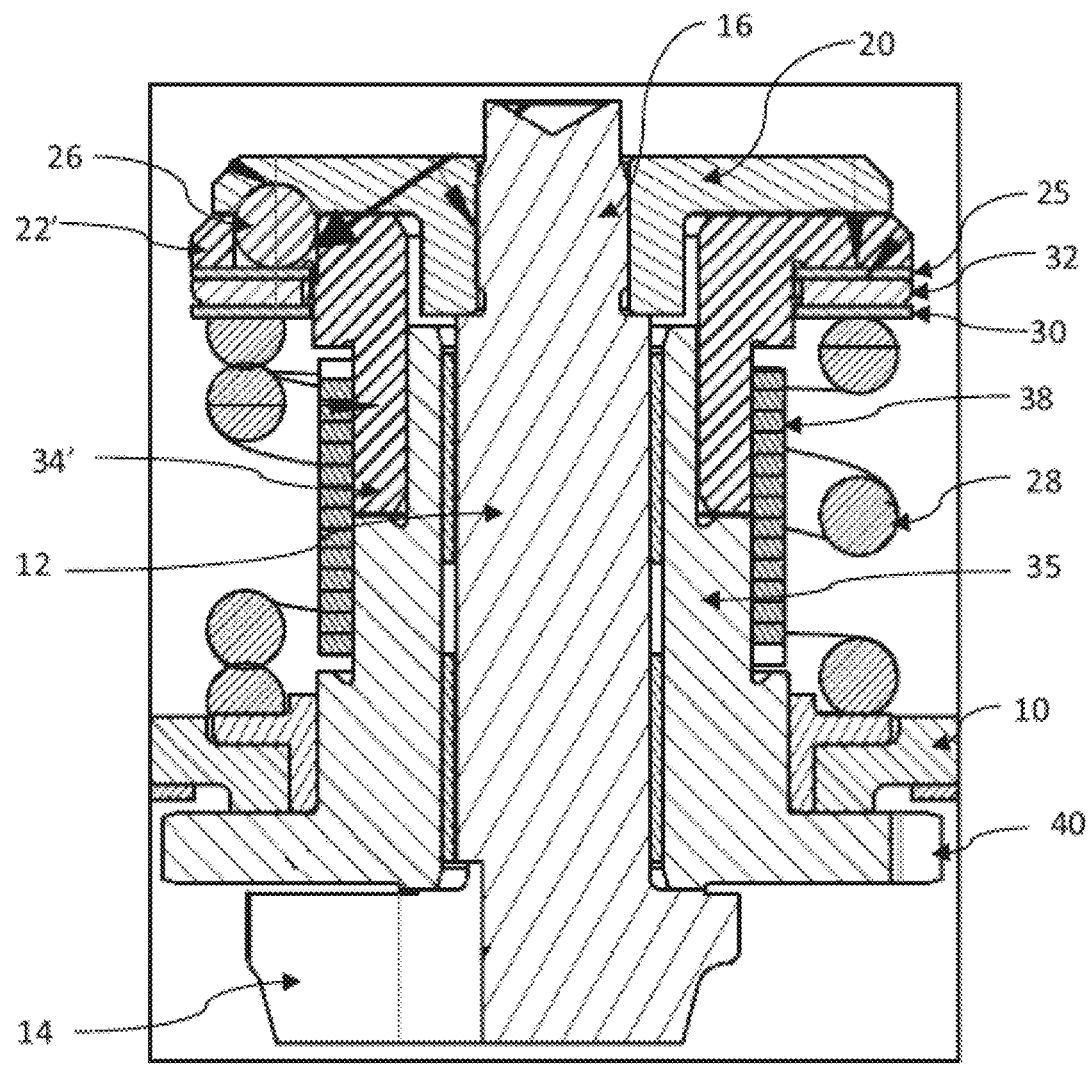
FIG. 4 is a cross section through a second embodiment of an adjuster.

FIG. 4 shows the same parts as FIG. 3, in cross section when fully assembled.

Figure 5:
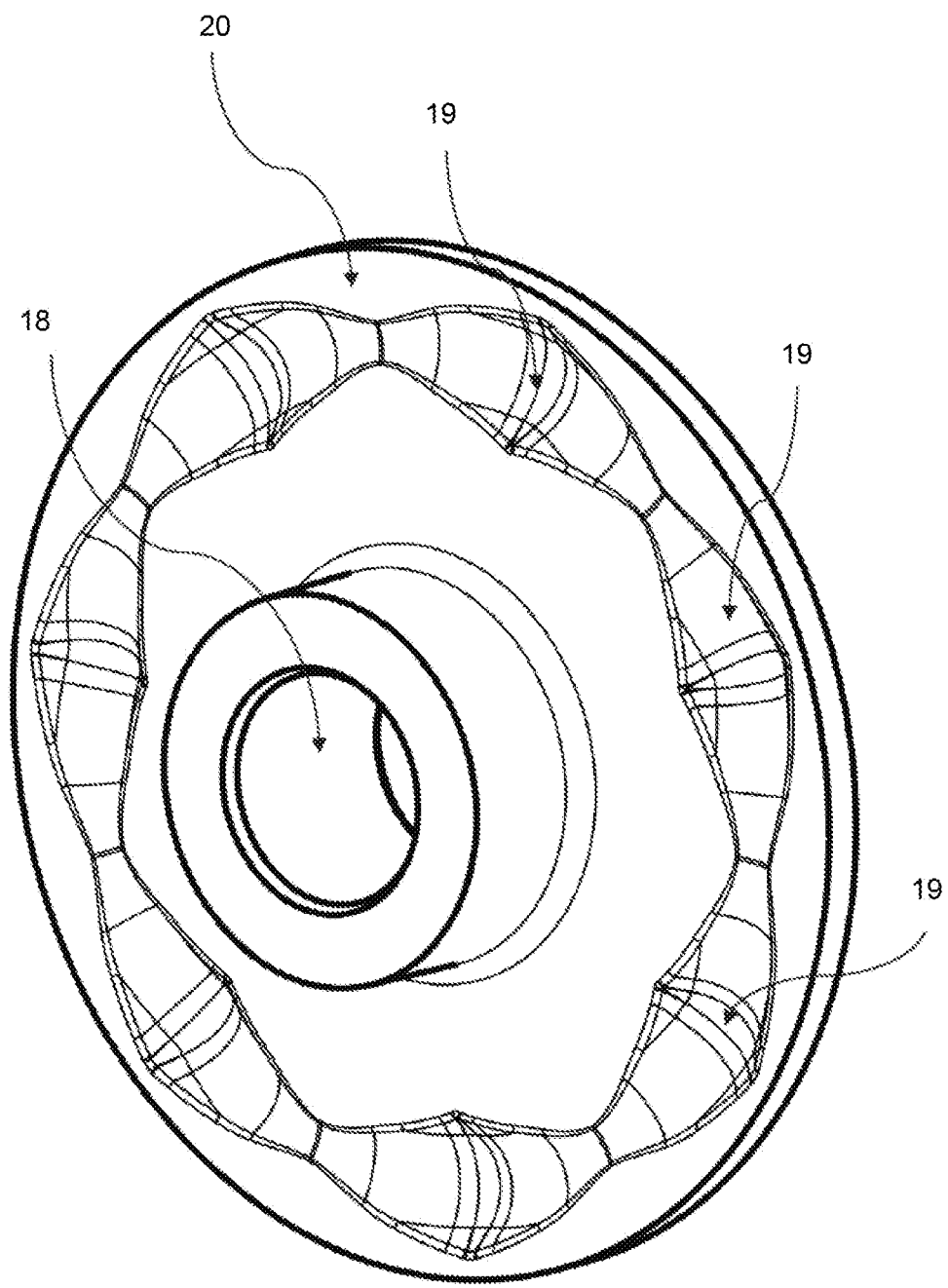
FIG. 5 shows a perspective view of an adjuster drive plate forming part of the adjuster of FIG. 1 and also the adjuster of FIG. 3.

Referring now to FIG. 5, the adjuster drive plate 20 which is used as a part in both embodiments is shown in perspective view. The adjuster drive plate 20 includes seven detents 19, corresponding with the seven ball bearing balls. The detents are joined to each other by ramps, i.e. the detents each become gradually shallower in either direction away from their centre. The ball bearing balls are therefore held substantially in the deeper centre of each detent 19, as long as the ball bearing balls are prevented from moving in the axial direction up the ramps. However, if the ball bearing balls are allowed to move axially (by overcoming the force of the spring, then the ball bearing balls move up the ramps and each one can eventually move into an adjacent detent. In normal operation, the angular extent of each of seven detents, including the ramps, is generally sufficient that the balls will not move into an adjacent detent, but by the balls moving up the ramps the adjuster drive plate 20 is allowed to rotate with respect to the ball-carrying plate 22. In this condition the over-torque clutch is over the torque limit, and will not transmit rotation.

Figure 6:
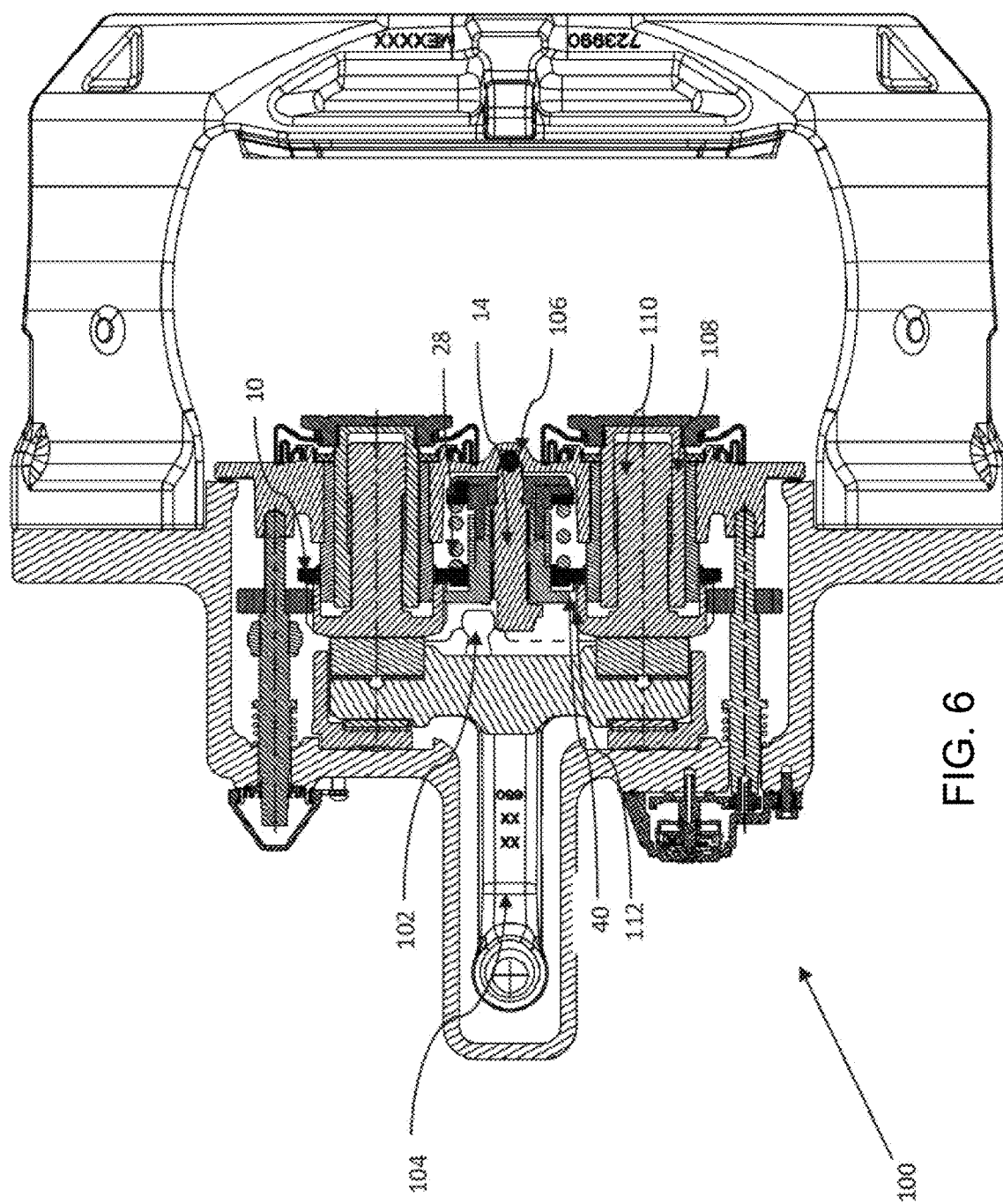
FIG. 6 is a cross section through a twin-piston sliding-caliper air disc brake showing a second embodiment of an adjuster in relation to the brake lever and drive pin.

Referring now to FIG. 6, a cross section of a caliper 100 for a twin-piston sliding-caliper air disc brake, is shown. The caliper 100 incorporates the adjuster of FIG. 3. Of particular note in FIG. 6 is the lever drive pin 102. This forms part of a brake lever 104. The brake lever 104 is actuated by a brake cylinder, and the drive pin 102 rotates as the brake lever is actuated. The brake lever drive pin 102 forms an input to the adjuster, by rotating the input shaft by the interface of the lever drive pin 102 and the slot 14.

FIG. 6 also shows how the spring 28 acts between return plate 10 and the front of the caliper 100. In this embodiment, the caliper is closed by a cover plate 106, but in other designs the front wall of the caliper could be integral with the caliper casting. The spring 28 therefore acts both to bias the over-torque clutch arrangement, and also to return the brake lever, via the return plate 10, on the off-stroke.

Each of the two pistons is formed of a piston sleeve 108 and a piston drive 110. The piston sleeve 108 and piston drive 110 are screw threaded to each other, so that the overall extent of each piston may be extended or contracted by rotating the piston sleeve 108 with respect to the piston drive 110.

The pistons are each fixed to the return plate 10. I.e. the pistons are attached to the return plate and cannot move axially with respect to the return plate. However, the piston components can rotate with respect to each other (and therefore at least one of the piston components rotates with respect to the return plate) and in doing so the overall length of the piston can increase or decrease.

At the rear end of the piston drive 110, a gear 112 is provided. The gear 112 of each piston interfaces with the adjuster output gear 40. Therefore, when the adjuster output gear rotates in the adjustment direction the pistons will both extend.

Both embodiments of the invention provide a reliable and long-lasting adjuster, which provides the useful "click" to aid setting the running clearance after pad replacement, whilst avoiding the "click" in high-load operating conditions, which can be perceived as a fault. At the same time, the part count and cost of the device is kept low.

The skilled person will appreciate that the embodiments are given as examples. The invention is set out in the claims.

What is claimed is:

1. An adjuster for an air disc brake, the adjuster comprising:
   a) an input shaft for engaging with a brake lever drive pin,
   b) an output for transmitting rotation to one or more brake pistons,
   c) a one-way clutch arrangement for transmitting rotation in one direction from the input shaft to the output, but preventing transmission of rotation from the input shaft to the output in the other direction; and
   d) an over-torque clutch arrangement for transmitting rotation from the input shaft to the output at torques below a predetermined torque threshold, but preventing transmission of rotation from the input shaft to the output at torques above the predetermined torque threshold,
      in which the over-torque clutch arrangement includes:
         a clutch plate
         a ball-carrying plate,
         a plurality of ball bearing balls, and
         a spring arrangement for forcing the ball bearing balls axially against the clutch plate by an axial spring force, the spring arrangement including at least one spring;
      wherein the clutch plate includes detents for seating the ball bearings and preventing rotational movement of the ball bearings relative to the clutch plate as long as axial movement of the ball bearings relative to the clutch plate is prevented by the axial spring force, and the detents including ramps for allowing the ball bearings to move rotationally relative to the clutch plate when the axial spring force is overcome, and wherein the ball-carrying plate includes pockets in the form of through holes for retaining the balls in position relative to the ball-carrying plate as the balls move rotationally relative to the clutch plate,
      in which a base for the through holes is provided by a thrust washer disposed behind the ball-carrying plate, and in which the spring arrangement is arranged to bias the thrust washer towards the ball carrying plate, in which one of the clutch plate and the ball-carrying plate provides an input to the over-torque clutch arrangement and the other of the clutch plate and the ball-carrying plate provides an output of the over-torque clutch arrangement.

2. The adjuster as claimed in claim 1, in which the spring arrangement is arranged to bias the ball-carrying plate towards the clutch plate.

3. The adjuster as claimed in claim 1, in which the through holes have a depth that is at least half the diameter of the balls.

4. The adjuster as claimed in claim 1, in which the ball-carrying plate remains axially fixed at torques both above and below the predetermined torque threshold.

5. The adjuster as claimed in claim 4, in which the ball-carrying plate is integrated into a clutch hub.

6. The adjuster as claimed in claim 1, in which the one-way clutch arrangement comprises a wrap spring or a sprag clutch.

7. The adjuster as claimed in claim 1, in which the clutch plate is on a driving side of the over-torque clutch arrangement and in which the ball-carrying plate is on a driven side of the over-torque clutch arrangement.

8. An air disc brake for a road vehicle, incorporating an adjuster according to claim 1.

9. The air disc brake as claimed in claim 8, in which the air disc brake is a twin-piston brake, in which each of two pistons are fixed axially to a return plate, and said spring is provided between a return plate and a front wall of a caliper for returning the brake to an "off" condition, and in which said spring provides the spring arrangement of the over-torque clutch of the adjuster.

10. The air disc brake as claimed in claim 9, in which the adjuster is disposed between the two pistons.

11. An adjuster for an air disc brake, the adjuster comprising:
    an input shaft for engaging with a brake lever drive pin, and
    an output for transmitting rotation to one or more brake pistons, the adjuster further including:
       a one-way clutch arrangement for transmitting rotation in one direction from the input shaft to the output, but preventing transmission of rotation from the input shaft to the output in the other direction; and
       an over-torque clutch arrangement for transmitting rotation from the input shaft to the output at low torques, below a predetermined torque threshold, but preventing transmission of rotation from the input shaft to the output above the predetermined torque threshold,
    in which the over-torque clutch arrangement includes a clutch plate and a ball-carrying plate, a plurality of ball bearings, and a spring arrangement for forcing the ball bearings axially against the clutch plate, the clutch plate including detents for seating the ball bearings and preventing rotational movement of the ball bearings relative to the clutch plate as long as axial movement of the ball bearings relative to the clutch plate is prevented by the spring force, and the detents including ramps for allowing the ball bearings to move rotationally relative to the clutch plate when the axial force of the spring arrangement is overcome, and the ball-carrying plate including pockets in the form of blind holes for retaining the balls in position relative to the ball-carrying plate as the balls move rotationally relative to the clutch plate,
    in which one of the clutch plate and the ball-carrying plate provides an input to the over-torque clutch arrangement and the other of the clutch plate and the ball-carrying plate provides an output to the over-torque clutch arrangement,
    and in which the spring arrangement is arranged to bias the ball-carrying plate towards the clutch plate.

12. The adjuster as claimed in claim 11, in which the blind holes have a depth that is at least half the diameter of the balls.

13. The adjuster as claimed in claim 11, in which the blind holes have straight sides.

14. The adjuster as claimed in claim 11, in which the one-way clutch comprises a wrap spring or a sprag clutch.

15. The adjuster as claimed in claim 11, in which the clutch plate is on a driving side of the over-torque clutch arrangement and in which the ball-carrying plate is on a driven side of the over-torque clutch arrangement.

16. The adjuster for an air disc brake of claim 11, wherein the air disc brake is part of a road vehicle.

17. The air disc brake as claimed in claim 16, in which the brake is a twin-piston brake, in which each of two pistons is fixed axially to a return plate, and a spring is provided between the return plate and a front wall of the caliper for returning the brake to the "off" condition, and in which said spring provides the spring arrangement of the over-torque clutch of the adjuster.

18. The air disc brake as claimed in claim 17, in which the adjuster is disposed between the two pistons.

\* \* \* \* \*